(12) United States Patent
Harrel et al.

(10) Patent No.: US 6,629,392 B1
(45) Date of Patent: Oct. 7, 2003

(54) STRUCTURE FOR MANUFACTURE OF PREFABRICATED BUILDINGS

(76) Inventors: Marcus J. Harrel, 1105 Calle Dulce, Chula Vista, CA (US) 91910; Michael J. Schimpf, 12631 Caminito Radiante, San Diego, CA (US) 92130

( * ) Notice: Subject to any disclaimer, the term of this patent is extended or adjusted under 35 U.S.C. 154(b) by 19 days.

(21) Appl. No.: 09/592,001

(22) Filed: Jun. 12, 2000

Related U.S. Application Data (63) Continuation-in-part of application No. 09/172,741, filed on Oct. 14, 1998, now Pat. No. 6,073,410.

(51) Int. Cl.[7] .............................. E04C 2/04; C04B 12/00
(52) U.S. Cl. .................... 52/481.1; 52/489.1; 52/483.1; 52/434; 156/71; 428/294.7
(58) Field of Search .......................... 52/435, 434, 474, 52/481.1, 483.1, 309.7, 309.16, 801.1, 801.11

(56) References Cited

U.S. PATENT DOCUMENTS

| | | |
|---|---|---|
| 1,241,187 A | 9/1917 | Berliat |
| 1,778,315 A | 10/1930 | Ferguson |
| 1,902,565 A | 3/1933 | Marks |
| 1,959,119 A | 5/1934 | Young |
| 2,029,009 A | 1/1936 | Anning |
| 2,141,919 A | 12/1938 | Kotrbaty |
| 2,853,394 A | 9/1958 | Riddell et al. |
| 3,214,875 A | 11/1965 | Slowinski et al. |
| 3,965,633 A | 6/1976 | Carroll |
| 4,241,553 A | 12/1980 | Reicherts et al. |
| 4,441,292 A * | 4/1984 | Ericsson ..................... 52/309.7 |
| 4,748,781 A * | 6/1988 | Wencley ..................... 52/309.5 |
| 4,793,861 A | 12/1988 | Sohm |
| 5,225,237 A | 7/1993 | Magnani |
| 5,279,091 A | 1/1994 | Williams et al. |
| 5,353,563 A * | 10/1994 | White ..................... 52/309.13 |
| 5,499,480 A | 3/1996 | Bass |
| 5,524,412 A | 6/1996 | Corl |
| 5,644,880 A | 7/1997 | Lehnert et al. |
| 5,664,388 A | 9/1997 | Chapman et al. |
| 5,692,353 A | 12/1997 | Bass et al. |
| 5,729,945 A | 3/1998 | Menchetti et al. |
| 5,758,463 A * | 6/1998 | Mancini ................... 52/309.12 |
| 6,073,410 A * | 6/2000 | Schimpf et al. ........... 52/481.1 |

FOREIGN PATENT DOCUMENTS

FR 318 021 1/1902

\* cited by examiner

*Primary Examiner*—Robert Canfield (57) ABSTRACT

The present invention resides in a structure which is particularly advantageous for the manufacture of prefabricated buildings. The structure uses a uniquely formulated exterior wall panel that is bonded to a frame of support members. A connecting member may be used to accommodate support members having a wide variety of cross-sectional shapes. The structure may have a unique cementitious composition that allows it to be fire and insect resistant and generally impervious to moisture.

19 Claims, 7 Drawing Sheets

STRUCTURE FOR MANUFACTURE OF PREFABRICATED BUILDINGS

CROSS-REFERENCE TO RELATED APPLICATIONS

This is a Continuation-in-part of U.S. Pat. No. 6,073,410, issued Jun. 13, 2000, from U.S. application Ser. No. 09/172,744 filed Oct. 14, 1998.

BACKGROUND OF THE INVENTION

The present invention relates to prefabricated structures, and more particularly, to prefabricated wall units using unique concrete formulations and stud and beam configurations for ease of manufacture.

Existing prefabricated structures may be formed of wall units using C-channel studs such as, for example, the wall units disclosed in U.S. Pat. No. 5,524,412. The wall unit is formed by pouring a first layer of cementitious composition into a mold and placing a frame of C-channel steel beams or studs onto this first layer. A second layer of cementitious composition is poured into a mold to a depth sufficient to cover a flange portion of the C-channel to form the wall unit. However, it is often difficult to fill and cover the C-channel flange, resulting in inefficiencies in manufacture.

Further, the cementitious composition should be formulated to provide a durable surface and to be compatible with a steel stud. Existing wall units based on C-channel steel studs generally require flex anchors for attachment because of a difference in the coefficient of expansion between steel and existing compositions.

Accordingly, there exists a definite need for a prefabricated structure having a durable exterior surface that is easily and efficiently attached to support members. The present invention satisfies these needs.

SUMMARY OF THE INVENTION

The present invention is embodied in a structure and unique formulation or composition for the manufacture of prefabricated buildings. The structure includes a panel, a frame of support members, and bonding pads. Each of the support members has a defined length, a center portion of a defined height and thickness, and first and second opposed sides each of a defined width. A cross section of the support members presents a defined shape consisting of the center portion in combination with the first and second opposed sides. The bonding pads bond the panel to the frame by attaching to the frame and to one or more of the first opposed sides of the support members. The panel and the bonding pads are prepared from a cured/hardened moldable building material.

The moldable building material may be a cementitious material. Prior to cure, the cementitious material may comprise a composition, by weight, of about 40.3% cement, about 40.3% sand, about 2.9% glass fibers, about 4.0% acrylic polymer, about 0.4% super plasticizer and about 12.1% water. The cementitious material may contains reinforcing fibers such as steel, fiberglass, polymer, graphite, or Kevlar®. Alternatively, the moldable building material may be a polymer-based resin containing fiberglass. The support members may be of metal, fiberglass, or wood. The bonding pads may enclose one or more segments of the first side(s) of one or more of the support members.

In more detailed features of the invention, the structure may include a connecting member. The connecting member may be interposed between one or more of the support members and the panel at the point where the bonding pads enclose segments of the first opposed side(s) of one or more of the support members. The connecting member may be affixed to the one or more support members. The connecting member may have an extended portion having a width that is greater than the width of the first opposed sides.

The extended portion of the connecting member may have one or more perforations for admitting the moldable building material therethrough, prior to curing or hardening of the moldable building material. The connecting member may be affixed to the support member by one or more fasteners and may be entirely contained within the bonding pad. The connecting member may extend along the length of the support member beyond the enclosed segment of the support member and may wraps around a portion of the support member.

The defined shape of the support members defines a structure that may have a width greater than the thickness of the center portion, thereby providing an anchor point for the bonding pads. The cross section of the support members may appear as an I, an L, an H, a C, a J, a T, a Z, a rectangle, or a pair of opposed triangles separated by the center portion. Finally, the frame may be load-bearing.

Other features and advantages of the present invention should become apparent from the following description of the preferred embodiments, taken in conjunction with the accompanying drawings, which illustrate, by way of example, the principles of the invention.

DETAILED DESCRIPTION OF THE PREFERRED EMBODIMENTS

The present invention resides in a structure and formulation for the manufacture of prefabricated buildings. The structure uses a uniquely formulated panel that is bonded to a frame of support members. The unique cementitious composition of the structure allows it to be relatively insect resistant and generally impervious to moisture.

Figure 1:
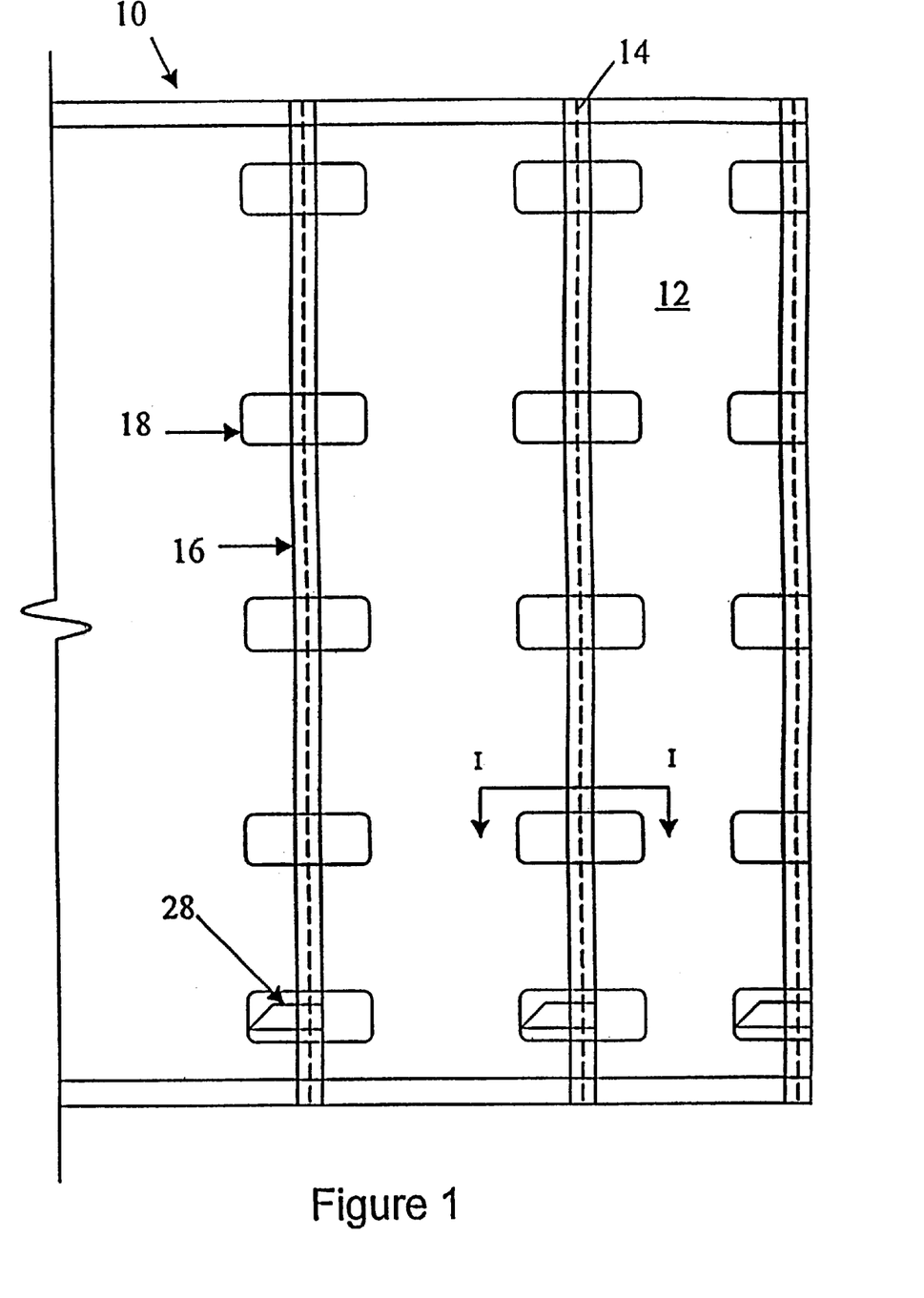
FIG. 1 is an elevation view of a structure having a frame of lightweight support members bonded to a panel of cementitious material, according to the present invention.

As shown in FIG. 1, the structure 10 of the invention may be formed of a panel 12 bonded to a frame 14 of support members 16 by bonding pads 18. The panel may be formed of a suitable moldable building material such as a cementitious composition or a polymer-based resin containing fiber glass or the like. An external wall panel formed of a cementitious composition generally may have a thickness between about ¼ inches and about 1 inch. An advantageous thickness is about ⅝ inches. The cementitious material may be composed of a mixture of cement, polymer, plasticizer, fiberglass, water and sand. The following Table 1 indicates the preferred relative proportions, by weight prior to cure, of the ingredients for the cementitious material:

TABLE 1

| (% by weight - uncured) | Preferred | Range | Limit |
|---|---|---|---|
| Portland cement | 40.3% | 25–55% | ≧25% |
| Sand | 40.3% | 25–55% | ≦55% |
| Reinforcing fibers | 2.9% | 1–5% | ≦5% |
| Acrylic polymer | 4.0% | 1–10% | ≈1.6% |
| Super plasticizer | 0.4% | 0–2% | ≧0% |
| Water | 12.1% | 10–15% | ≈11% |

The composition limit column indicates an empirical limit based on experience with compositions used in practice. The range indicates compositions that should provide suitable moldable building material.

The reinforcing fibers may be alkali resistant glass fibers and may be provided on spools and cut into lengths of about ½ inch to about 1½ inches prior to mixing with the other materials. Suitable spools of fiber are available from Nippon Electric Glass America Inc. (Part No. ACS 13H530X). Alternatively, the reinforcing fibers may be formed of steel, polymer, graphite or Kevlar®.

The acrylic polymer may be a Forton compound (VF-774) available from Ball Consulting, Ltd. of Ambridge, Pa. Alternatively, the acrylic polymer may be a Poly Plex polymer available from Nippon Electric Glass America, Inc. The super plasticizer may be DARACEM 19 available from W.R. Grace of Cambridge, Mass.

Preferably, the cementitious material is mixed together using an automated batch mixer. A typical batch size is approximately 260 pounds with the materials weighed by a computer operated batch load center in increments of ¹⁄₁₀ of a pound. The wet materials (water, polymer, and super plasticizer) are mixed together first. The cement and the sand are added to the wet material and mixed together for 5 minutes to form a slurry. Then the fiberglass is added and the slurry is mixed together for less than 2 minutes. The wet slurry has a pot life of about 1 hour.

Depending on the mixing equipment, smaller batch sizes may be mixed, including batches mixed by hand. Further, the mixing sequence may be changed depending on batch size or mixing equipment. For example, using a tailgate mixer, it may be advantageous to mix the dry material first and then to add the wet materials.

To form the structure 10, the mixed slurry is poured into a mold (not shown) having a depth approximately equal to the desired thickness of the panel 12. Form release oil is applied to the mold before the slurry is poured into the mold. The slurry is tamped and evenly spread to fill the mold. After the slurry has been spread to a relatively uniform thickness in the mold, the frame 14 of support members 16, which was preassembled, is set into place on the panel 12 while it is still in the mold and before the slurry has set.

Figure 2:
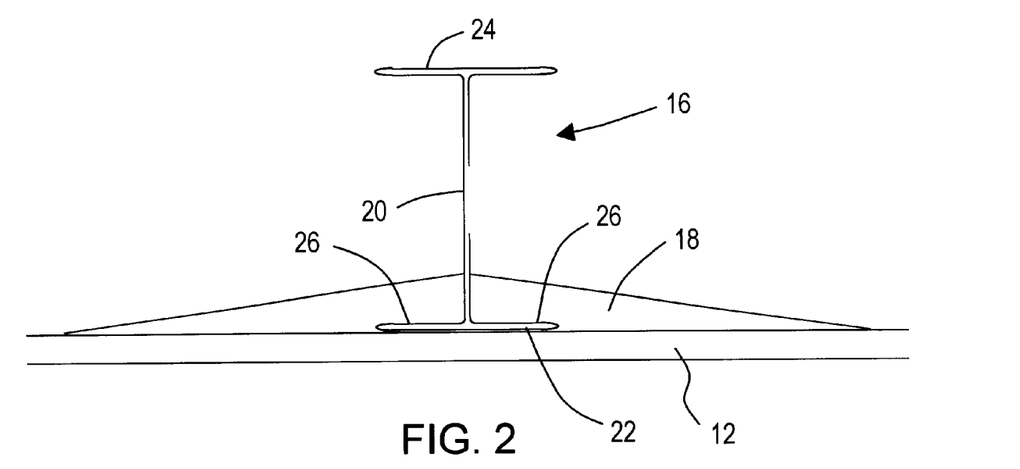
FIG. 2 is a cross-sectional plan view of a bonding pad, taken along line I—I of FIG. 1, showing the bonding pad attaching an I-shaped support member to the panel.

The frame is attached to the panel 12 by the mounting patches or pads 18. The pads are formed by placing the slurry at points along the individual support members. The pads are tamped into place to integrate them into the panel and are shaped by hand or using a tool. Although the pad's shape may vary greatly, a cross-section of a desired pad shape is shown in FIG. 2. The pad may have a width of about 5.5 inches on either side of the support member with the pad's thickness tapering away from the support member. The pad may have a height of about 6 inches.

As discussed in more detail below, the support member has a defined length, a center portion 20 of a defined height and thickness, and first and second opposed sides, 22 and 24. Each of the opposed sides has a defined width. A cross section of the support member presents a defined shape consisting of the center portion in combination with the first and second opposed sides. The defined shape of the support member is configured such that segments 26 of the first opposed sides are covered with the pad slurry with relative ease allowing for efficient manufacture of the unit. Thus, the bonding pads may enclose segments of the first opposed sides of the support members.

For a structure 10 having a height (or support member length) of about 8 feet, five bonding pads 18 have been found to securely attach each support member 16 to the panel 12. The bonding pads may be spaced about 21 inches apart (center-to-center), with the top and bottom pads being no more than about 6 inches from the top and bottom of the frame 14, respectively. The structure may vary in height and the number of bonding pads may be increased or decreased proportionally such that the distance between the closest edges of adjacent bonding pads is not more than about 18 inches.

A gravity strap 28 may be attached to each support member 16 and covered by a respective bonding pad 18 to prevent slippage over time of the panel 12 down along the length of the support members. The gravity strap may be formed of 22 gauge sheet metal having a width of about 1½ inches and a length of about 5 inches. The gravity strap may be attached to the beam by sheet metal screws, welds, or the like.

After the frame 14 has been attached to the panel 12 by the bonding pads 18, the structure 10 is allowed to cure in the mold for a minimum of 12 hours. The cure time may be reduced using a curing kiln. After cure, the structure is then removed from the mold by using a spreader bar, clamps and an overhead crane or forklift. The cured unit may be stored in a storage rack in a vertical orientation until it is ready for use.

The support members 16 may be formed of a variety of cross-sectional shapes. The support member shown in FIG. 2 has an "I" cross-sectional shape. The I-shaped member may be a beam or a stud rolled from sheet metal or extruded. The support member may also be formed of fiber glass and resin, or the like. The I-shaped member has a center portion 20 and the first and second opposed sides, 22 and 24. The bonding pads 18 cover segments 26 of the first opposed side to firmly affix the support members to the panel.

Figure 3:
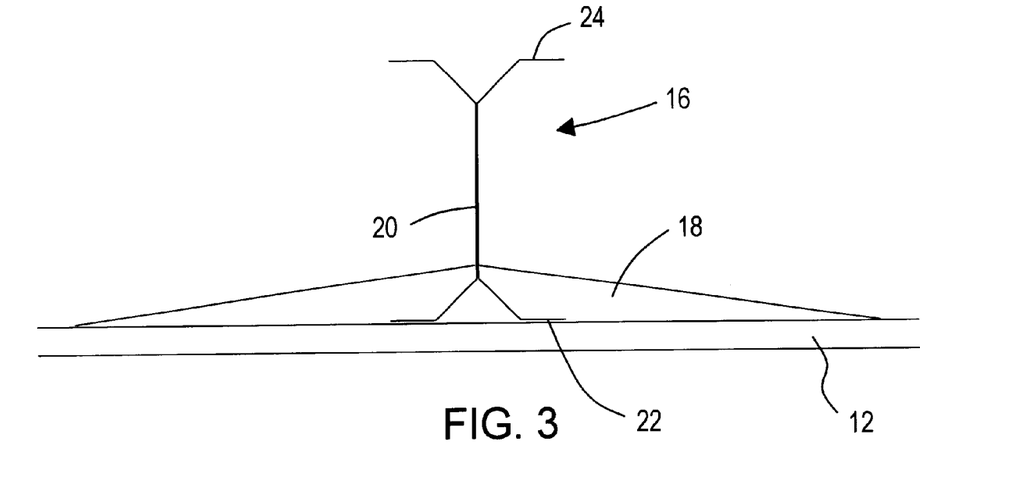
FIG. 3 is a cross-sectional plan view of a bonding pad showing the bonding pad attaching an X-shaped support member to the panel.
Figure 4:
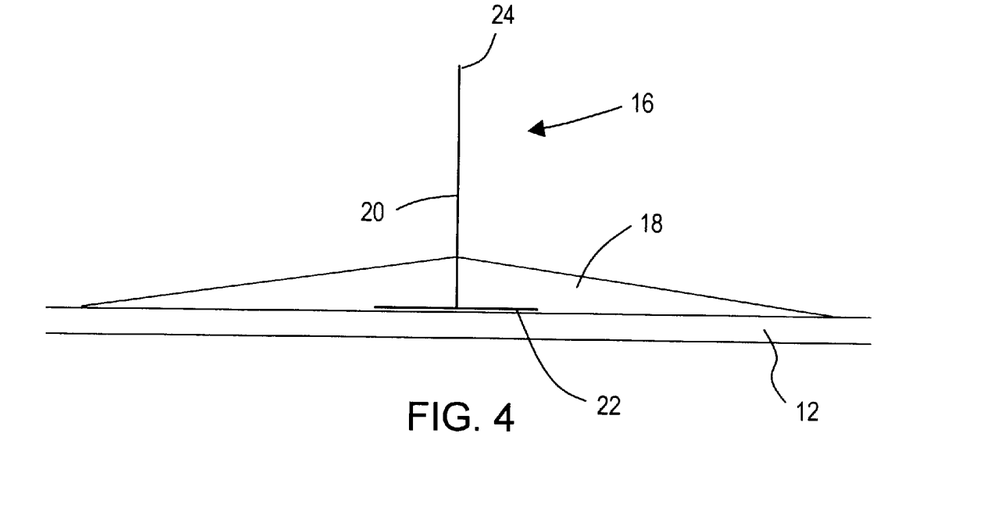
FIG. 4 is a cross-sectional plan view of a bonding pad showing the bonding pad attaching an inverted T-shaped support member to the panel.

The support members 16 shown in FIGS. 3 and 4 have an "X" cross-sectional shape and an inverted "T" cross-sectional shape, respectively. The X-shaped member and the T-shaped member each have a center portion 20 and first and second opposed sides, 22 and 24.

Figure 5:
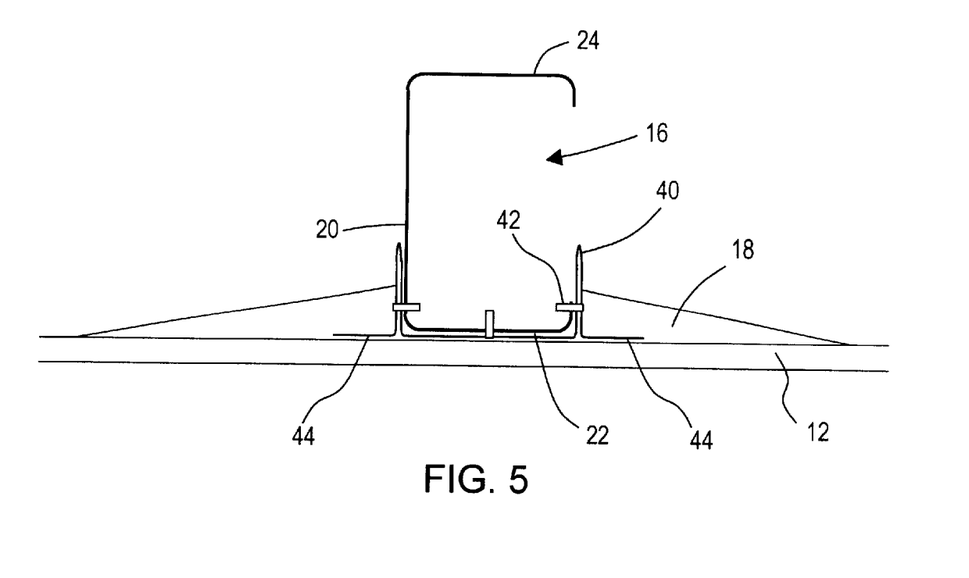
FIG. 5 is a cross-sectional plan view of a bonding pad showing the bonding pad attaching C-channel support member to the panel using a connecting member.
Figure 6:
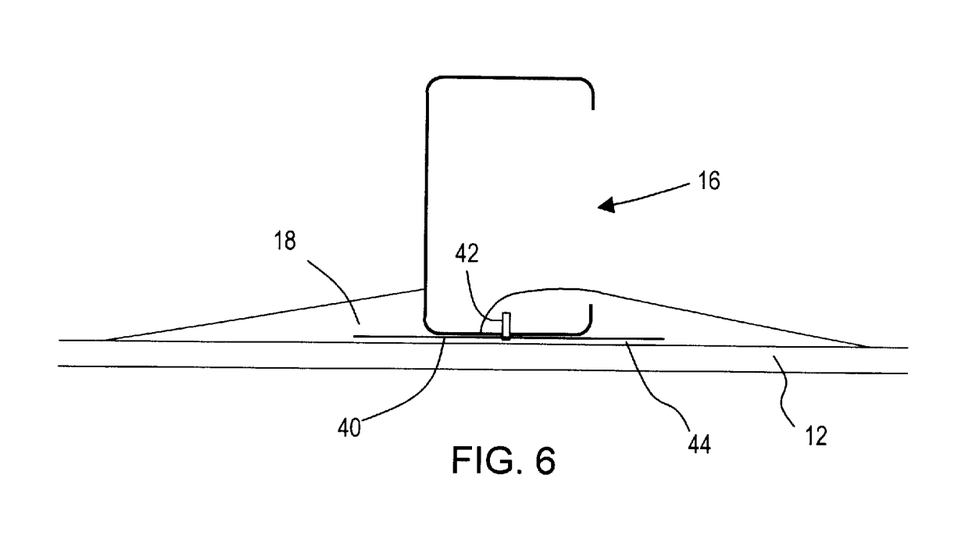
FIG. 6 is a cross-sectional plan view of a bonding pad showing the bonding pad attaching C-channel support member to the panel using a flat plate connecting member.
Figure 7:
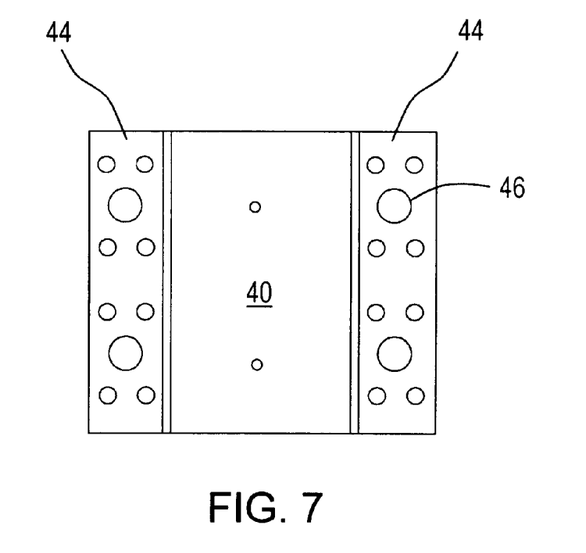
FIG. 7 is an elevation view of the connecting member of FIG. 5.
Figure 8:
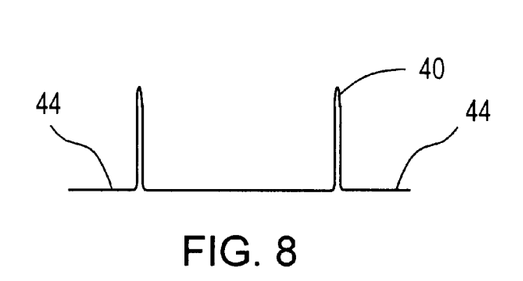
FIG. 8 is an plan view of the connecting member of FIG. 5.

Alternatively, as shown in FIGS. 5–6, the support member 16 may be a "C" channel having a connecting member 40 interposed between the C-channel and the panel 12. The connecting member may be welded to the C-channel or fastened by screws 42 or the like. The connecting member, shown in FIGS. 7–8, may be rolled sheet metal that provides a recess for receiving the C-channel. Alternatively, the connecting member may be a flat plate (FIG. 6). The connecting member has extended portions 44 that extend from the support member and are covered by the bonding pad 18.

The connecting member 40 may have one or more holes 46 or perforations for admitting the slurry therethrough prior to curing or bonding of the moldable building material to further strengthen the attachment between the frame 14 and the panel 12. The connecting members may have a length that extends only under the bonding pads 18.

Figure 9:
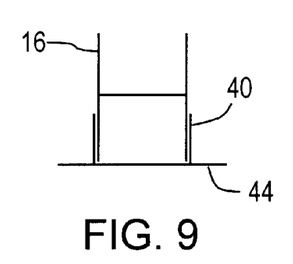
FIG. 9 is a cross-sectional plan view of the connecting member for use with an H-shaped support member.
Figure 10:
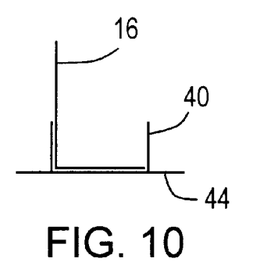
FIG. 10 is a cross-sectional plan view of the connecting member for use with an L (or J)-shaped support member.
Figure 11:
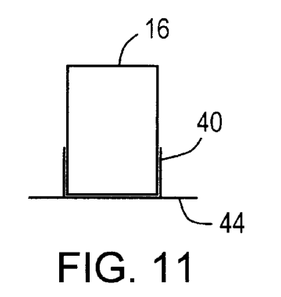
FIG. 11 is a cross-sectional plan view of the connecting member for use with a rectangularly-shaped support member.

The connecting member 40 permits the use of support members 16 having a wide variety of cross-sectional shapes. For example, as shown in FIGS. 9–11, the support member may have an H, L, or a rectangular cross-sectional shape, respectively.

Figure 12:
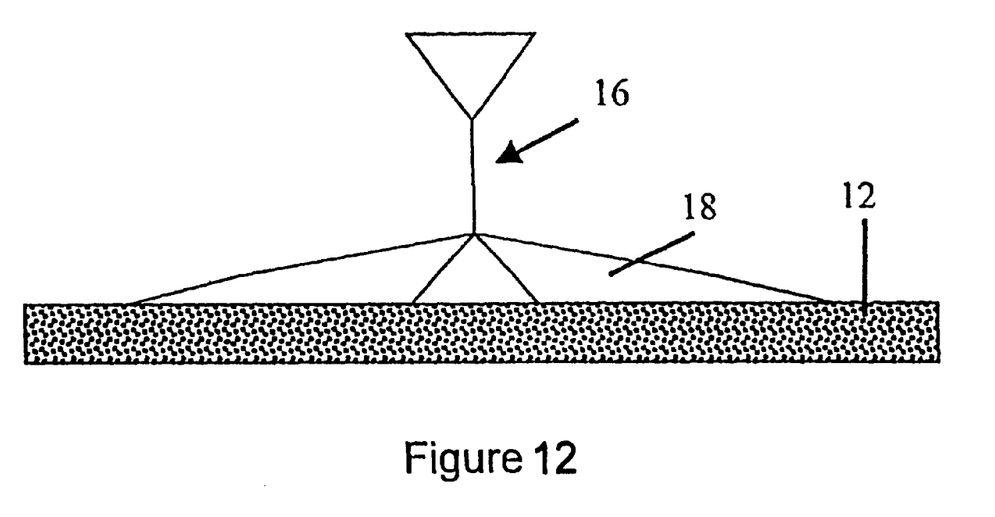
FIG. 12 is a cross-sectional plan view of a bonding pad showing the bonding pad attaching the panel to a support member having triangularly-shaped ends.
Figure 13:
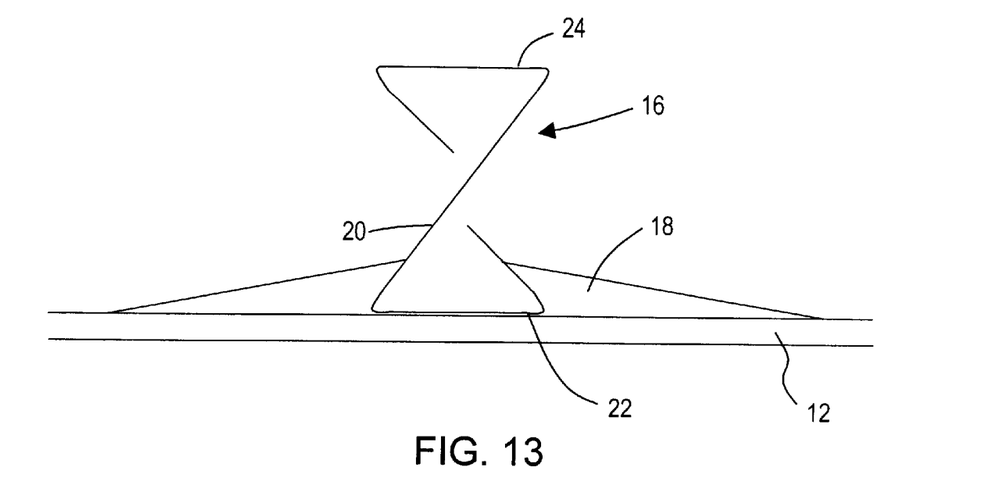
FIG. 13 is a cross-sectional plan view of a bonding pad showing the bonding pad attaching an Z-shaped support member to the panel.

The support members 16 may be a steel beam or stud having a lightweight double triangular shape as shown in FIG. 12. The lightweight steel beam consists of a flat center portion 20 and two triangular sides 22 and 24. The plate of metal that forms the beam's flat center member may have holes cut or punched in therethrough. The holes allow for a passage for pipes, electrical wires, and the like, through the wall unit. Also, as shown in FIG. 13, the support member may have a "Z" cross-sectional shape. The slurry for the bonding pad 18 covers and encloses the sloped edges of the first sides 22 of the support members.

Figure 14:
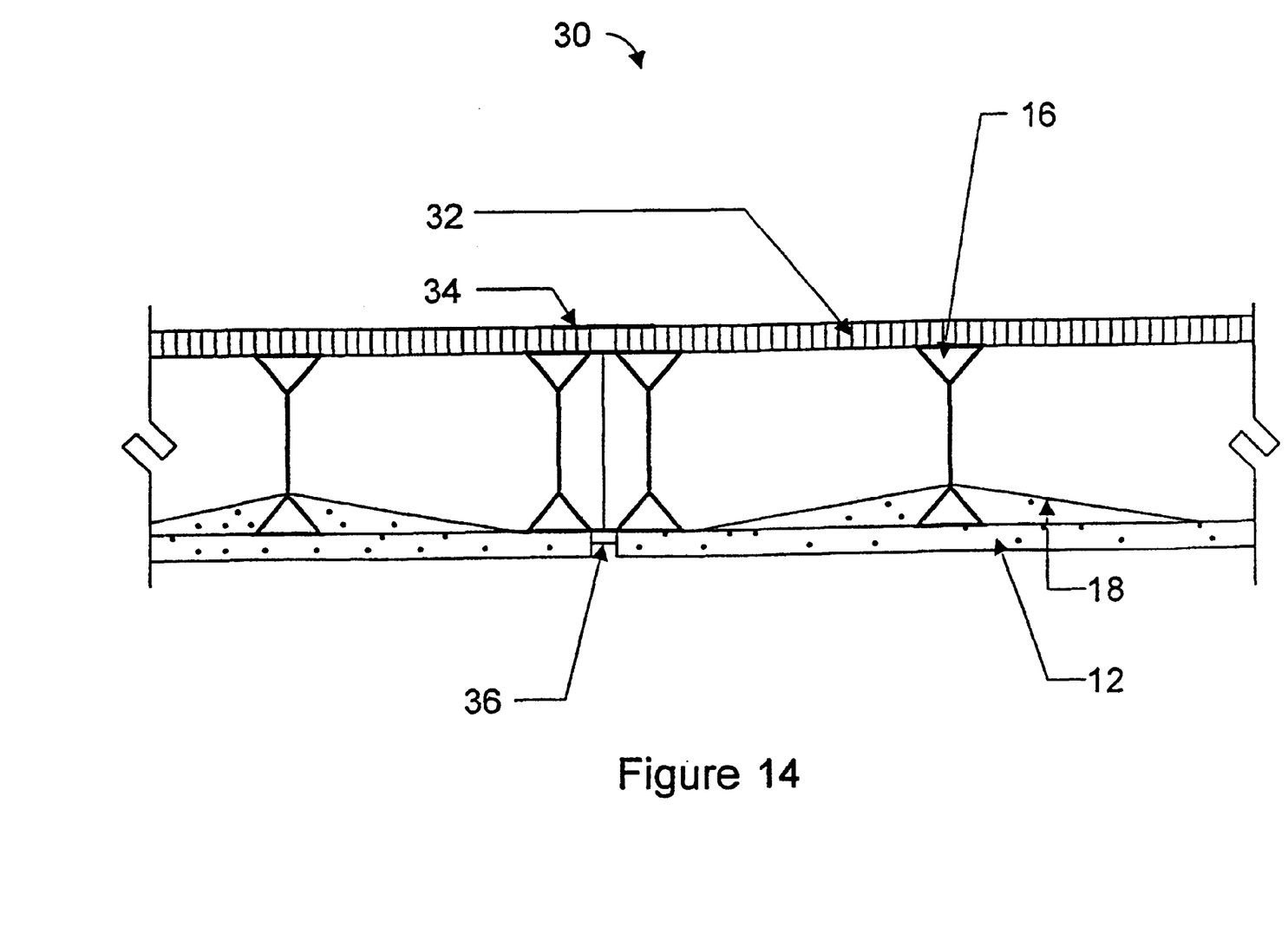
FIG. 14 is a cross-sectional plan view of two units of FIG. 1 coupled together to form a larger wall structure.

The structure of the present invention is particularly advantageous for constructing a prefabricated building. Several structures 10 may be coupled together to form a wall 30 as shown in FIG. 14. The wall's interior surface may be covered by drywall panels 32 and patched together using drywall tape 34 and drywall compound. Any spaces between the exterior panels 12 may be filled with caulk 36. Also, the structure 10 of the invention may be used as a roof unit or a floor unit. Further, the cross-sectional height or width of the support members may be increased to accommodate an increased bearing load. The prefabricated building may be assembled entirely in a factory and shipped to its final destination for attachment to a foundation and utilities.

While the foregoing has been with reference to specific embodiments of the invention, it will be appreciated by those skilled in the art that these are illustrations only and that changes in these embodiments can be made without departing from the principles of the invention, the scope of which is defined by the appended claims.

What is claimed is:

1. A structure, comprising:
   a panel;
   a frame comprising support members, wherein each of the support members has a defined length, a center portion of a defined height and thickness, and first and second opposed sides each of a defined width, wherein a cross section of the support members presents a defined shape consisting of the center portion in combination with the first and second opposed sides;
   bonding pads that bond the panel to the frame by attaching to the frame and to one or more of the first opposed sides of the support members, wherein the bonding pads enclose one or more segments of the first opposed side(s) of one or more of the support members, and wherein the panel and the bonding pads are prepared from a cured/hardened moldable building material; and
   one or more connecting members, the connecting member(s) being interposed between one or more of the support members and the panel at the point where the bonding pad(s) encloses segment(s) of the first opposed side(s) of one or more of the support members, the connecting member(s) having an extended portion having a width that is greater than the width of the first opposed side(s), and the connecting member(s) being optionally affixed to the one or more support members.

2. A structure according to claim 1, wherein the moldable building material is a cementitious material.

3. A structure according to claim 2, wherein, prior to cure, the cementitious material comprises, by weight, greater than about 25% cement, less than about 55% sand, less than about 5% glass fibers, greater than about 1.6% acrylic polymer, and greater than about 11% water.

4. A structure according to claim 3, wherein, prior to cure, the cementitious material comprises, by weight, in the range of about 25–55% cement, in the range of about 25–55% sand, in the range of about 1–5% glass fibers, in the range of about 1–10% acrylic polymer, and in the range of about 10–15% water.

5. A structure according to claim 3, wherein, prior to cure, the cementitious material comprises a composition, by weight, of about 40.3% cement, about 40.3% sand, about 2.9% glass fibers, about 4.0% acrylic polymer, about 0.4% super plasticizer and about 12.1% water.

6. A structure according to claim 2, wherein the cementitious material contains reinforcing fibers.

7. A structure according to claim 6, wherein the reinforcing fibers are steel, fiberglass, polymer, graphite, or Kevlar®.

8. A structure according to claim 1, wherein the moldable building material is a polymer-based resin.

9. A structure according to claim 8, wherein the polymer-based resin contains fiberglass.

10. A structure according to claim 1, wherein the support members are metal, wood, or fiberglass.

11. A structure according to claim 1, wherein the extended portion of the connecting member(s) has one or more perforations for admitting the moldable building material therethrough, prior to curing or hardening of the moldable building material.

12. A structure according to claim 1, wherein each connecting member is entirely contained within the corresponding bonding pad.

13. A structure according to claim 1, wherein the defined shape defines a structure that has a width greater than the thickness of the center portion, thereby providing an anchor point for the bonding pads.

14. A structure according to claim 1, wherein the cross section of the support members appears as an I, an L, an H, a C, a J, a T, a Z, a rectangle, or a pair of opposed triangles separated by the center portion.

15. A structure according to claim 1, wherein the frame is load-bearing.

16. A structure, comprising:
   a panel formed of a cementitious building material;
   a frame comprising support members, wherein each of the support members has a defined length, a center portion of a defined height and thickness, and first and second opposed sides each of a defined width, wherein a cross section of the support members presents a defined shape consisting of the center portion in combination with the first and second opposed sides;

a plurality of bonding patches that bond the panel to the frame by attaching to the frame and to one or more of the first opposed sides of the support members, the support member(s) having spaced-apart bonding patches along the length of the support member, wherein the plurality of bonding patches are prepared from a cured/hardened moldable cementitious building material, and the bonding patches enclose one or more segments of the first side(s) of one or more of the support members; and a connecting member, the connecting member being interposed between one or more of the support members and the panel at the point where the bonding patches enclose segments of the first opposed side(s) of one or more of the support members, and wherein the connecting member is optionally affixed to the one or more support members.

17. A structure, comprising:

a panel;

a frame comprising support members, wherein each of the support members has a defined length, a center portion of a defined height and thickness, and first and second opposed sides each of a defined width, wherein a cross section of the support members presents a defined shape consisting of the center portion in combination with the first and second opposed sides;

bonding pads that bond the panel to the frame by attaching to the frame and to one or more of the first opposed sides of the support members, wherein the bonding pads enclose one or more segments of the first opposed side(s) of one or more of the support members, and wherein the panel and the bonding pads are prepared from a cured/hardened moldable building material; and one or more connecting members, the connecting member(s) being interposed between one or more of the support members and the panel at the point(s) where the bonding pad(s) enclose segment(s) of the first opposed side(s) of one or more of the support members, and the connecting member(s) extending along the length of the support member(s) beyond the enclosed segment(s) of the support member(s).

18. A structure, comprising:

a panel;

a frame comprising support members, wherein each of the support members has a defined length, a center portion of a defined height and thickness, and first and second opposed sides each of a defined width, wherein a cross section of the support members presents a defined shape consisting of the center portion in combination with the first and second opposed sides;

bonding pads that bond the panel to the frame by attaching to the frame and to one or more of the first opposed sides of the support members, wherein the bonding pads enclose one or more segments of the first opposed side(s) of one or more of the support members, and wherein the panel and the bonding pads are prepared from a cured/hardened moldable building material; and one or more connecting members, the connecting member(s) being interposed between one or more of the support members and the panel at the point(s) where the bonding pad(s) enclose segment(s) of the first opposed side(s) of one or more of the support members, and the connecting member(s) wrapping around a portion of the support member.

19. A structure, comprising:

a panel;

a frame comprising support members, wherein each of the support members has a defined length, a center portion of a defined height and thickness, and first and second opposed sides each of a defined width, wherein a cross section of the support members presents a defined shape consisting of the center portion in combination with the first and second opposed sides;

bonding pads that bond the panel to the frame by attaching to the frame and to one or more of the first opposed sides of the support members, wherein the bonding pads enclose one or more segments of the first opposed side(s) of one or more of the support members, and wherein the panel and the bonding pads are prepared from a cured/hardened moldable building material; and one or more connecting members, the connecting member(s) being interposed between one or more of the support members and the panel at the point(s) where the bonding pad(s) enclose segment(s) of the first opposed side(s) of one or more of the support members, and the connecting member(s) being affixed to the support member(s) by one or more fasteners.

* * * * *